Figure 2:
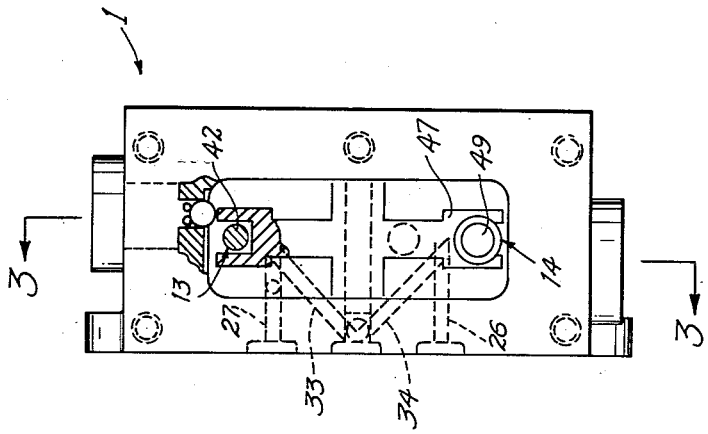

Feb. 4, 1964 R. F. HERETH 3,120,245
MASS-BALANCED VALVE APPARATUS
Filed March 2, 1962 2 Sheets-Sheet 1

INVENTOR.
RALPH F. HERETH
BY
ATTORNEYS

INVENTOR.
RALPH F. HERETH
BY
ATTORNEYS

United States Patent Office 3,120,245
Patented Feb. 4, 1964

3,120,245
MASS-BALANCED VALVE APPARATUS
Ralph F. Hereth, Port Orchard, Wash., assignor to the United States of America as represented by the Secretary of the Navy
Filed Mar. 2, 1962, Ser. No. 177,715
2 Claims. (Cl. 137—596.17)
(Granted under Title 35, U.S. Code (1952), sec. 266)

The invention described herein may be manufactured and used by or for the Government of the United States of America for governmental purposes without the payment of any royalties thereon or therefor.

The present invention relates to valves and, in particular, to multiple-positioned valves used to selectively control the direction of fluid pressure flow.

One of the more difficult problems present in many hydraulically operated mechanisms is that of heavy shock or vibration causing the valves to drift out of their fixed positions. For example, ordinance equipment, such as the apparatus used to launch guided missiles, experiences extremely heavy shocks and, in many instances, faulty operation is traceable directly to valve drift. More specifically, such launchers are known to employ a large number of two or three position solenoid-actuated, pilot valves to control other main pressure line valves and, obviously, the pilot valves must maintain their fixed positions so that the main hydraulic flow can be properly applied. However, conventional pilot valves have proven unable to resist the heavy shock of these systems and their resulting drift has produced serious difficulties.

Various expedients, of course, have been employed to lock or hold such valves in their set positions and, in some environments, the problem has been solved. For the most part these expedients apply a restraining force to the valve spools, although the force used usually is mechanically applied by means of detents or the like, and, obviously, such detents are effective only to the extent that their mechanical restraint is sufficient to resist the large thrust forces developed by the shock. Also some valve positions are maintained only by spring action so that even moderate vibration or shock forces are disrupting.

It is therefore an object of the present invention to provide a multiple-position fluid pressure valve capable of maintaining its set positions when subjected to shock or vibration forces.

Another object is to provide a means for resisting accidental valve movement or drift, the resulting means itself being accomplished independent of mechanical locks or other similar restraints.

A further object is to provide such a multiple-position valve having one of its positions achieved solely through the application of a resilient pressure, such as a spring pressure, the valve further being capable of maintaining this one position without the use of mechanical restraining means.

Still another object is to provide a solenoid-actuated pilot valve utilizing the solenoid actuation to produce the valve spool throw, as well as detent means to fix the valve in its proper position and other non-mechanical means to restrain the valve spools in their fixed positions.

A further object is to provide a valve in accordance with the foregoing objects which is capable of being manually set in its desired positions.

Other objects which will become more apparent in the ensuing description are to provide a thoroughly reliable, small, compact and simply constructed mass-balanced valve.

The accomplishment of the foregoing objects principally features the use of a so-called "mass-balanced" principle. More specifically, the present valve utilizes a pair of valve spools or pistons which may be reciprocated in various manners such as by solenoid actuation, this pair of spools then being interconnected one with the other by a rocker arm so that any movement of one of the spools is translated through the rocker arm into an opposite movement of the other spool. Further, the spools and their associated mechanisms are mass-balanced to the extent that any thrust force to which the valve may be subjected applies itself equally to each of the spools. Consequently, since the thrust on each spool is equal, the tendency of one of the spools to be jarred or moved out of its fixed position is compensated by the equal and opposite force on the other spool. In other words, the other spool is applying an equal force which tends to hold the valve in its fixed position.

In the preferred invention, certain other features permit a manual setting of the valve. Also, a special detenting arrangement supplements the restraining force exerted by the mass-balanced effect. Another preferred feature is the use of a spring-center valve position permitted by the mass-balanced arrangement of the spools.

Figure 1:
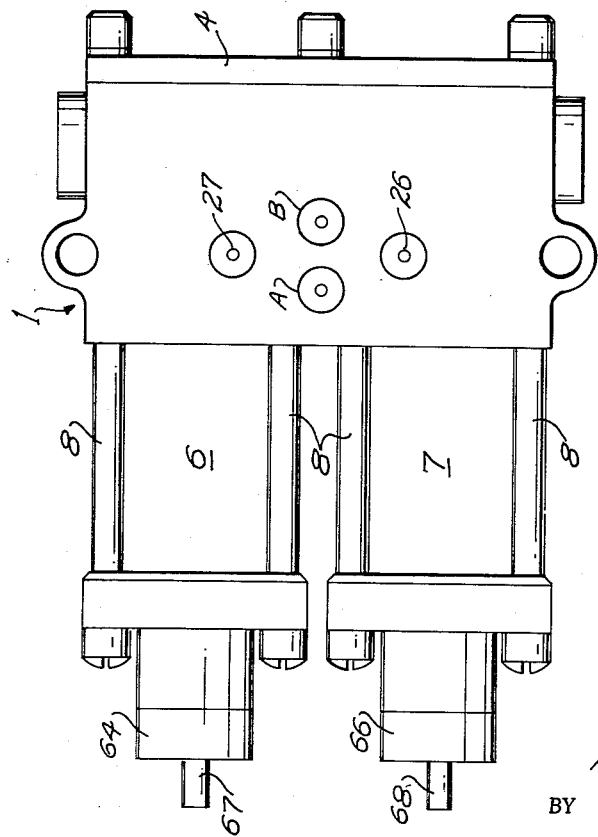
Figure 3:
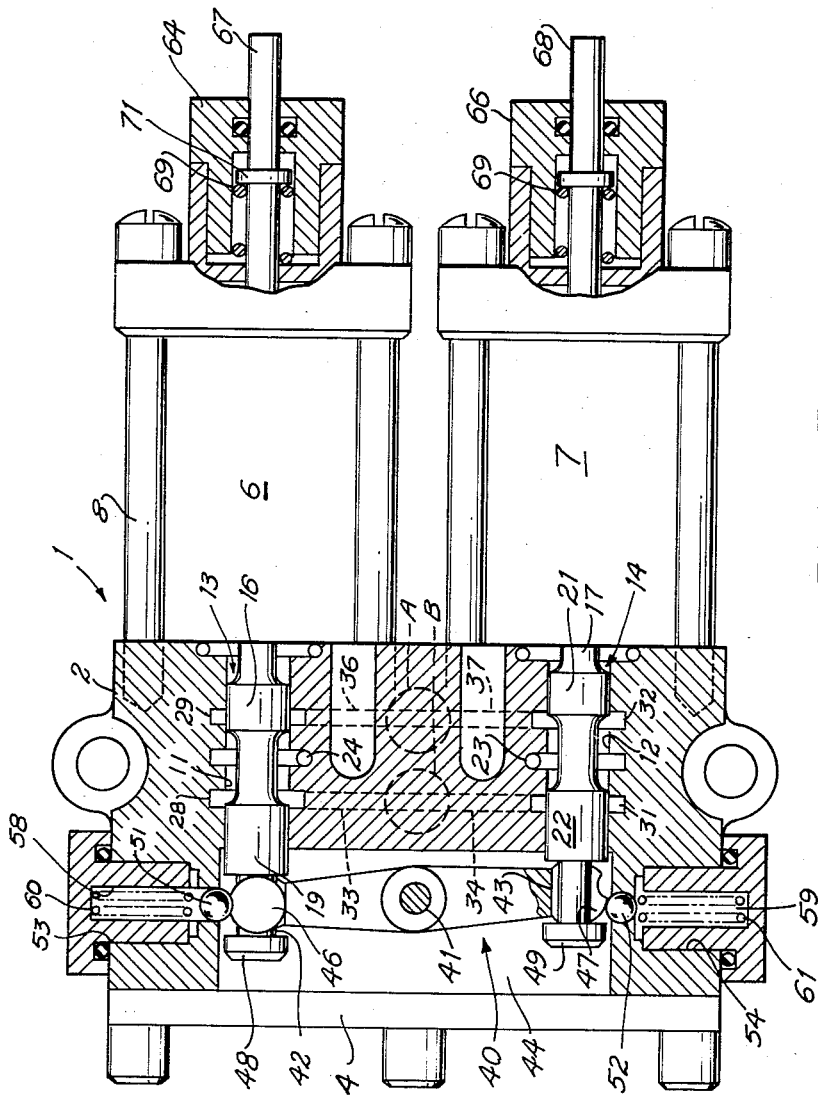

One embodiment of the invention is illustrated in the accompanying drawings of which:

FIG. 1 is a bottom view of the present valve;
FIG. 2 is a side view of the valve with its end cover removed; and
FIG. 3 is a section along line 3—3 of FIG. 2.

Referring to the drawings, the operative portions of the valve are contained in a casing 1 formed of a body portion 2 (FIG. 3) to one end of which is bolted a cover 4. At the other end of casing body 2 are mounted a pair of solenoid cylinders 6 and 7, these cylinders each being secured to the body by bolts 8.

Interiorly, body 2 is formed with a pair of axially parallel bores or cylinders 11 and 12 in which are slidably mounted a pair of valve spools 13 and 14. The spools are formed with shaft portions 16 and 17 of substantially uniform diameter, shaft 16 or spool 13 having a pair of lands 18 and 19, while shaft 17 of the other spool has a similar pair of lands 21 and 22.

The lands, of course, are for the conventional purpose of controlling fluid pressure flow. More specifically, the porting arrangement is one in which fluid pressure is admitted into cylinder 12 through a pressure port 23 (FIG. 3), the coupling to tank being through another port 24 communicating with valve spool cylinder 11. Port 23 communicates with a passage way or bore 26 extending transversely through valve body 2 to the rear of the valve (FIG. 3) where it may be coupled by a suitable hydraulic line to the pressure source. Similarly, port 24 communicates with a passage 27 adapted to be coupled to tank at the rear of the valve.

As has been indicated, the present valve is used to control the direction of fluid flow. As illustrated, the valve control is capable of alternating pressure flow between a pair of hydraulic cylinders identified in FIGS. 1 and 3 by letters A and B. In actual practice, cylinders A and B could be a pair of hydraulic cylinders used to set the spool of another control valve through which the main supply of hydraulic pressure is ported to actuate certain hydraulic components. Application of pilot valve pressure to cylinder A would set the spool of control valve in one of its positions, while application of the pilot valve pressure to the other cylinder would set the control valve spool in its other position. To permit the application of pilot valve pressure to both cylinders, valve spool cylinders 11 and 12 both are formed with a pair of ports 28, 29 and 31, 32. Ports 28 and 31 are communicated with cylinder B through passages 33 and 34, while ports 29 and 32 communicate with cylinder A through passages 36 and 37.

To reciprocate valve spools 13 and 14 so as to alternate the supply of pressure to cylinders A and B, both spools are positively actuated by solenoid mechanisms contained in solenoid casings 6 and 7, the solenoids being entirely conventional and well-known. The solenoid of casing 6 is energized through a standard electrical power supply to move spool 13 to the left (FIG. 3), while the other solenoid acts in a similar manner on spool 14. As shown in the drawing, spool 13 has been shifted by energizing the casing 6 solenoid. The other solenoid is not then energized.

One of the principal features of the present invention is the fact that any solenoid-actuated movement of one or the other of the spools is translated or imparted to the other spool by means of a rocker arm 40. To achieve this purpose, rocker arm 40 is centrally pivoted on a pin 41 appropriately journaled in body portion 2 of the casing. Also, the ends of the rocker arm are coupled to the valve spools. For this latter purpose, spools 13 and 14 each have an end portion 42 and 43 projecting outwardly of valve spool cylinders 11 and 12 into a chamber portion 44 of the valve casing, these outward projections being formed as yokes 46 and 47, to receive the spool ends. Portions 42 and 43 of the spools terminate in enlarged disks or buttons 48 and 49 so that, in the obvious manner, a pivotal movement of the rocker arm causes it to move the spools by pressing either against the buttons or against the spool lands. Due to the rocker arm arrangement, it is equally obvious that energization of one of the solenoids produces equal though opposite movement of the other spool.

For some uses, it also may be found advisable to use a detenting mechanism which, as shown in FIG. 3, can be in the form of spring-urged balls or spheres 51 and 52. More specifically, balls 51 and 52 each are mounted in spherical cavities formed in body portion 2 of the valve casing at the end of internal bores 53 and 54. To press the balls radially inwardly, caps 56 and 57 are threadably or otherwise received in bores 53 and 54, each of the caps being formed with a spring chamber 58 and 59 mounting coil springs 60 and 61 which bear against the balls.

A further feature of the invention is the fact that the valve spools can be manually set. This arrangement is advantageous in the event that electrical power accidently is disrupted. To permit the manual setting, each of the spools is extended axially through its solenoid casing and outwardly through cylinders 64 and 66 threaded onto the ends of the casings, the outward projections being identified by numerals 67 and 68. Cylinders 64 and 66 are formed with central bores containing coil springs 69, which bear at one end against the solenoid cylinders and at the other end against the spring retainer members 71, mounted one on each of the valve spools. Thus, when the casing 6 solenoid is energized, its valve spool moves to the left (FIG. 3) to compress its spring and, of course, at the same time, the other valve spool, by means of its rocker arm coupling, is moved to the right to carry its spring retainer member 71 against the interior wall of its cylinder. As also will be apparent, the movement of valve spool 13 is limited by its detenting, spring-pressed ball 51.

The principal advantage of the rocker arm lies in its ability to effectively hold the valve spools in their set positions, and, as has been indicated, this ability is achieved by assuring that the valve spools are mass-balanced. Functionally considered, the valve spools are balanced to the extent that any forces acting on the valve impart equal thrust forces to each of the valve spools. In other words, assuming a heavy shock force to be applied to the right hand end of the valve (FIG. 3) the valve spools must be so balanced that the resulting thrust developed on each spool is equal. When such an equality is achieved, the valve spools are counterpoised to the extent that any force tending to move that valve spool to the left is met by the equal force on the other valve spool. More specifically, a thrust on valve spool 14 is imparted through rocker arm 40 into an equal and opposite thrust on valve spool 13. However, since the thrust forces on valve spool 13 and 14 are equal, the translated force is effectively met and the valve spools maintain equilibrium. In actual practice, the balancing of the valve spools should be accomplished empirically since the coupling of the spools to the rocker arm will have some effect on this balance.

The operation of the illustrated valve should be rather apparent from the foregoing description. Obviously, when the solenoid of casing 6 is energized, spool 13 moves to the left and spool 14 to the right. As shown in FIG. 3, pressure then is admitted through port 23 and is transmitted through port 32 and passage 37 into cylinder A. Cylinder B then is communicated with tank.

To port pressure to cylinder B, the solenoid of casing 7 is energized throwing valve spool 14 to the left and valve spool 13 to the right. The flow then proceeds from pressure port 23 through port 31 and passage 34 into cylinder B. In this event, cylinder A then is communicated with tank.

Although the valve illustrated in the drawings essentially is a two position valve, it also is possible to utilize it as a three position valve, the third position being what is known as a spring-centered position in which neither solenoid A nor B is energized. In this latter event, springs 69, being of equal spring pressure, exert equal forces on spools 13 and 14 to move them into a balanced position in which both cylinders A and B are ported to tank. Obviously, since only the springs hold the spring-centered position, the use of the mass-balanced principle to maintain the position is most important. The use of detenting in such an arrangement is optional.

It also is possible, by modifying the spool and port arrangement, to utilize the mass-balanced principle in other types of valves. For example, it is obvious that a spring could be substituted for one of the solenoids so that one valve position would be solenoid actuated while the other would be fixed by a spring-return when the solenoid is deenergized. It also is apparent that detenting supplements but is not essential to operation. Further, the principle of mass-balance is not limited to pilot valves.

Obviously many modifications and variations of the present invention are possible in the light of the above teachings. It is therefore to be understood that within the scope of the appended claims the invention may be practiced otherwise than as specifically described.

What is claimed is:
1. A fluid pressure valve comprising:
   a valve body formed interiorly with a pair of parallel valve spool chambers,
   a valve spool movably mounted in each chamber with a portion thereof projecting outwardly therefrom,
   a pivotal rocker arm interconnecting said outward projections for translating movement of one into an opposite movement of the other,
   said spools and their rocker arm interconnections being of equal size and mass to the extent that forces acting on the valve produce equal and counter balancing thrusts on each spool,
   said spools further each being formed with an armature portion also projecting outwardly of its spool chamber,
   said valve body being provided with fluid passages opening into each spool chamber and said spools each being formed with lands for selectively blocking and unblocking said openings upon spool movement,
   spool actuating means for selectively moving each spool, said actuating means including:
   a separate solenoid winding operatively disposed in proximity to the armature portion of each spool,
   winding support means, and
   spring return means operatively bearing against each spool for maintaining the spools in a fixed position when said windings are deenergized,
   covering means secured to said valve body for enclosing said rocker arm, windings and the foregoing operative portions of said spools, said rocker arm being provided at its end portions with detents, and spring-urged ball means carried by said valve body in position for engaging said detents when said solenoid windings are deenergized.

2. The valve of claim 1 wherein a portion of each spool is extended outwardly of the valve for enabling manual shifting.

References Cited in the file of this patent

UNITED STATES PATENTS

| | | |
|---|---|---|
| 136,489 | Critchlow | Mar. 4, 1873 |
| 2,630,828 | Bent | Mar. 10, 1953 |
| 2,638,122 | Ludwig | May 12, 1953 |
| 2,674,232 | Mason | Apr. 6, 1954 |
| 2,916,049 | Ruhl | Dec. 8, 1959 |
| 2,916,050 | Ruhl | Dec. 8, 1959 |
| 2,982,306 | Fitzgibbon | May 2, 1961 |

FOREIGN PATENTS

| | | |
|---|---|---|
| 445,351 | Great Britain | Apr. 6, 1936 |